United States Patent

[11] 3,596,196

[72] Inventor John E. Riley
Saugus, Mass.
[21] Appl No 825,172
[22] Filed May 16, 1969
[45] Patented July 27, 1971
[73] Assignee General Electric Company

[54] ELECTRONIC PROCESS CONTROLLER WITH TRANSIENT POWER INTERRUPTION PROTECTION
2 Claims, 1 Drawing Fig.

[52] U.S. Cl. .......... 330/11, 330/51, 330/199, 330/99
[51] Int. Cl. .......... H03f 1/14
[50] Field of Search .......... 328/8, 9; 330/51, 11 P; 307/202

[56] References Cited

UNITED STATES PATENTS 3,200,346 8/1965 Young .......... 330/110

*Primary Examiner*—Nathan Kaufman
*Attorneys*—Frank L. Neuhauser, Oscar B. Waddell, William S. Wolfe, Gerald R. Woods and Joseph B. Forman

ABSTRACT: An electronic process controller with transient power interruption protection provided by a voltage-maintaining capacitor connected across the power supply terminals of the voltage amplifier. A blocking diode, in series with the power supply circuit, prevents discharge of the voltage-maintaining capacitor through the power supply circuit during a power outage.

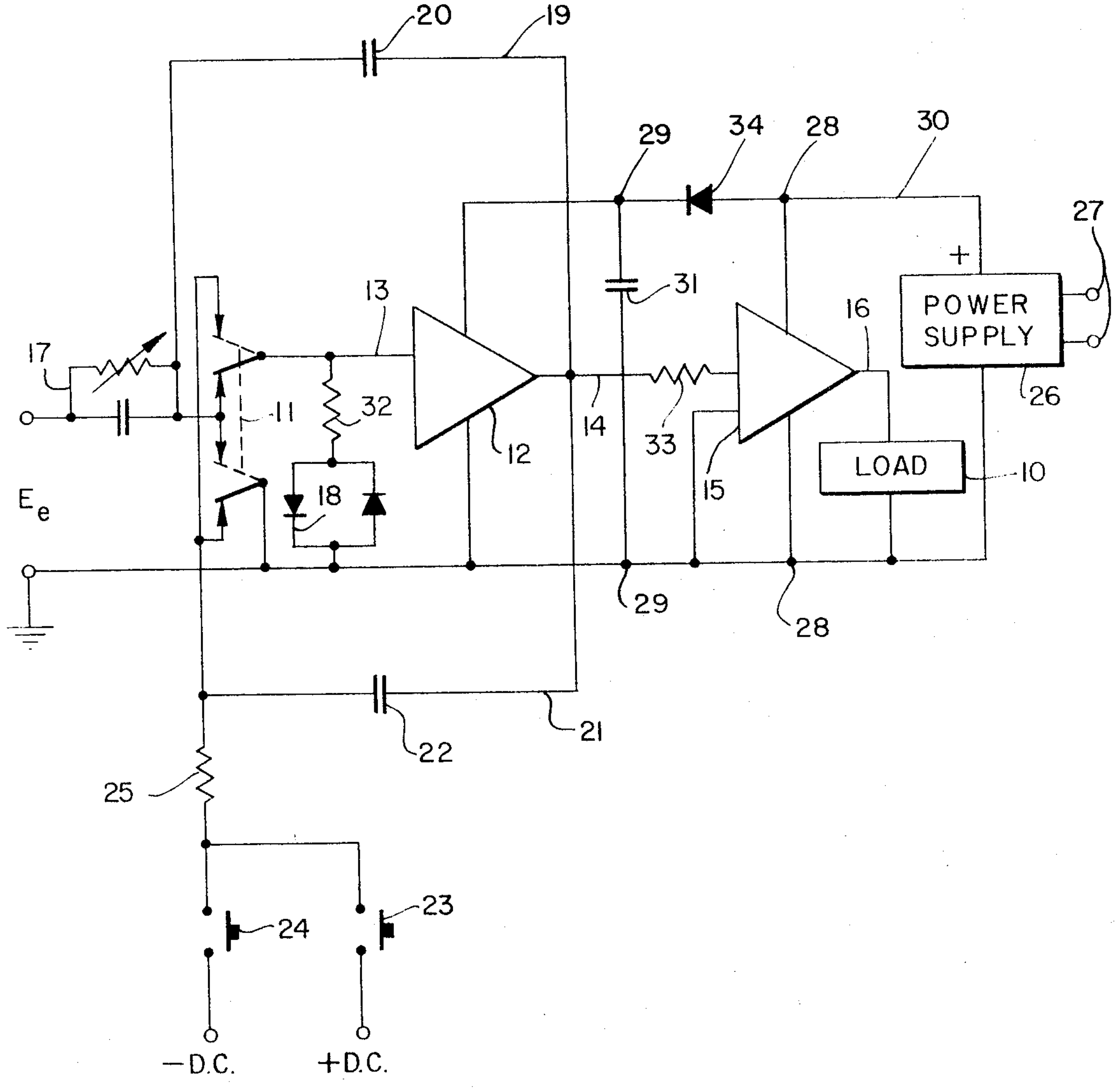
INVENTOR
JOHN E. RILEY
BY
George A. Herbster
ATTORNEY

ELECTRONIC PROCESS CONTROLLER WITH TRANSIENT POWER INTERRUPTION PROTECTION

BACKGROUND OF THE INVENTION

The present invention relates to process controllers of the electronic type and more particularly to a process controller having protection against control swings or "bumps" caused by transient power interruption.

Process controllers of the electronic type are now widely used for automatic control of industrial processes. Such controllers receive an error signal derived from a measured process variable, such as temperature, or pressure, and produce an output signal which controls an external transducer, such as a motor controlled valve, in such a manner as to reduce the error signal to zero. Typically, such a controller comprises a voltage amplifier having an input circuit controlled by an error signal, an output circuit controlling a load, and a negative feedback circuit including a capacitor interconnecting the input and output circuits of the amplifier to stabilize the control system. The amplifier is energized through a power supply circuit that applies operating voltage to the amplifier, the power supply circuit, in turn, being supplied from a local power source such as a supply bus. Local power supplies are frequently subject to transient interruptions of the order of several hundred milliseconds duration caused by circuit breaker operation in the supply line, heavy transient loads, etc. These power interruptions often produce a disturbance in the operation of electronic process controllers whereby undesirable swings in the controlled process occur. Such operation of the process controller is caused by the loss of applied voltage and hence output of the amplifier which permits the capacitor in the stabilizing feedback circuit to discharge. This, in turn, changes the operating level of the amplifier so that when power is restored a deviation in the control signal occurs until the capacitor is recharged by an increased voltage output of the amplifier. Such operating difficulties can, of course, be prevented by utilizing spacially designed local power supplies that are not subject to interruption. However, it is desirable to have protection against disturbances in the operation caused by power interruption built into the process controller itself because such controllers are often used in locations where special power supplies are not available.

Accordingly, it is an object of the present invention to provide an electronic process controller with built-in protection against control swings or "bumps" caused by transient power interruptions.

A further object of the invention is to provide a simple system for protecting an electronic process controller having automatic and manual modes of operation against disturbances caused by power interruption that is inexpensive to apply and reliable in operation.

Further objects and advantages of the invention will become apparent as the following description proceeds.

SUMMARY

Briefly, the invention is embodied in an electronic process controller having an amplifier provided with input and output circuits, a negative feedback circuit including a capacitor interconnecting the input and output circuits, and power supply connections connected to a power supply circuit. To prevent discharge of the capacitor in the feedback circuit during power interruptions, a voltage-maintaining capacitor is connected across the power supply connections of the amplifier having a size sufficient to maintain within desired limits the operating voltage on the amplifier during the power interruption period. Discharge of the voltage-maintaining capacitor back through a low impedance path in the power supply circuit during such power interruption period is prevented by the use of a blocking diode in series with the power supply circuit between the capacitor and the low-impedance path. A switching arrangement permits a number of feedback circuits along with their associated capacitors and automatic and manual control signals to be selectively connected in the amplifier input circuit in such a manner that protection is afforded by the voltage-maintaining capacitor for each mode of the controller operation.

For a better understanding of the invention reference should be made to the following detailed description taken in connection with the accompanying drawing.

BRIEF DESCRIPTION OF THE DRAWING

The drawing, which is partly diagrammatic, shows an electronic process controller embodying the system of the present invention for protecting the controller from disturbances caused by transient interruptions of power in the power supply circuit.

DESCRIPTION OF AN ILLUSTRATIVE EMBODIMENT

Referring to the drawing, the invention is shown as applied to an electronic process controller of the general type disclosed in U.S. Pat. No. 3,260,956 McNabb, issued July 12, 1966, and assigned to the same assignee as the present invention.

The controller operates to control the current supplied to a load 10 which may, for example, be a motor controlled valve used to control an industrial process in response to automatic or manually controlled signals selected by a transfer switch 11. The controller has a voltage amplifier 12 with an input circuit 13 to which input signals are supplied and an output circuit 14 connected to the input of a constant-current amplifier 15. An output connection 16 of the amplifier 15 supplies the control current to the load 10.

In the automatic operation mode the input signal to amplifier 12 is an error signal $E_e$ which is the difference between a process variable signal and a set point voltage (not shown). This signal is applied across an RC network 17 and the voltage amplifier input circuit, the latter having a pair of oppositely poled diodes 18 connected in shunt therewith to form a control signal limiting circuit. To stabilize the control system a negative feedback circuit 19 including a storage capacitor 20 interconnects the output circuit 14 to the input circuit 13 of amplifier 12 through the transfer switch 11. The diodes 18 selectively cooperate with the reset network 17 and the capacitor 20 of the feedback circuit to limit the input voltage of the amplifier 12. This will normally assure that, under automatic control, the process reaches the set point without any overshoot as explained in the aforesaid McNabb patent.

In the manually controlled mode when the transfer switch 11 occupies the position shown by the dotted lines, a second feedback circuit 21 including a second storage capacitor 22 interconnects the output circuit 14 to the input circuit 13 of the amplifier 12 through the transfer switch. Pushbuttons 23 and 24 selectively connect to the input circuit through a resistor 25 plus and minus sources of direct current to raise the lower the charge on the capacitor 22. By selectively depressing the pushbuttons 23 and 24 the amplifier is caused to integrate up and down to vary the output voltage of amplifier 12 and hence the current supplied to the load 10 by the constant-current amplifier 15. In this manner a manual control of the load 10 is achieved.

DC voltage is supplied to the amplifiers 12 and 15 from an external source 26 which may, for example, by a full-wave rectifier energized by a local AC supply bus connected to the terminals 27. The DC voltage output of power supply 16 is connected to terminals 28 of the amplifier 15 and terminals 29 of amplifier 12 through a power supply circuit 30 as shown.

It will be apparent that a transient interruption of the DC voltage from the power supply 26 will cause the voltage supplied to the amplifiers 12 and 15 and hence their outputs to drop. Without the protective system to be described, a reduction in the output of amplifier 12 would cause a corresponding reduction in the output of amplifier 15 and load 10. Upon restoration of power the output of amplifier 12 would not immediately return to its former value causing an undesired swing in the control system. The reason for this is as follows. When the controller is in the automatic mode, an interruption of voltage supplied to the terminals 29 of the amplifier 12 causes the output voltage supplied to output circuit 14 to drop. This permits capacitor 20 in the feedback circuit 19 to discharge through the diodes 18 and this, in turn causes a substantial change in the output level of the amplifiers 12 and 15. Similarly, when the controller is the manually controlled mode the capacitor 22 in feedback circuit 21 is discharged. The result is an undesirable swing or "bump" in the control system when the DC voltage from power supply 26 is restored. This operating difficulty is prevented, according to the invention, by a protective system which will now be described.

To prevent the DC supply voltage to amplifier 12 from dropping substantially during a power interruption, a voltage-maintaining capacitor 31 is connected across the supply voltage terminals 29 of the amplifier. The size of this capacitor should be sufficient to maintain the operating voltage within the desired operating limits of the amplifier during the power outage taking into account the impedance of the discharge paths through the amplifier circuits. In actual practice a capacitor of 350 mfd. had been found to be sufficient for this purpose. To increase the impedances of these discharge paths, a resistor 32 may be connected in series with diodes 18 and a resistor 33 connected in series with the output circuit 14.

To prevent discharge of the voltage-maintaining capacitor 31 back through a low-impedance path through the power supply 26 during a power outage, there is provided a blocking diode 34 connected in series with the power supply circuit 30. The diode 34 which may, for example, be a silicon diode 1N645, is poled as shown so that it presents a low impedance to current supplied to amplifier 12 from power supply 26 but presents a high impedance to discharge current from the voltage-maintaining capacitor 31 back through the power supply during a power outage.

It will be noted that with the switching arrangement provided by the transfer switch 11, the voltage-maintaining capacitor 31 acts to prevent discharge of capacitor 20 when the controller is in the automatic mode as well as capacitor 22 when the controller is in the manual control mode. It will also be noted that the transfer switch acts to connect capacitor 20 in the manual control position and the capacitor 22 in the automatic control position to the common input-output connection. This prevents "bumps" in the output control current during switching between the automatic and manual control positions.

While there has been shown what is presently considered to be the illustrative embodiment of the invention, it will be apparent to those skilled in the art that various changes and modifications may be made therein without departing from the spirit and scope of the invention.

I claim:

1. In a system including a two terminal power supply circuit wherein one of the terminals is a system common terminal, an electronic process controller having;

a voltage amplifier connected between the terminals of the power supply circuit and including an input terminal adapted to be connected to a control signal source, a control signal limiting circuit connected between the input terminal and the system common terminal, an output terminal, and a feedback circuit including a storage capacitor connected between the input and output terminals of the voltage amplifier; and protective means for maintaining the power supply voltage across the voltage amplifier during transient power interruptions in the power supply circuit to prevent discharge of the storage capacitor through the voltage amplifier, the system common terminal, and the control signal limiting circuit, said protective means comprising a capacitor connected across the power supply circuit connections of the voltage amplifier, said capacitor being charged to the power supply voltage during normal operation, and a diode connected in series with the power supply circuit to prevent discharge of the capacitor through the power supply circuit during the transient power interruptions.

2. An electronic process controller of the type recited in claim 1 wherein the control signal limiting circuit comprises the series combination of a current-limiting resistor with a pair of inversely poled, parallel-connected diodes.